C. H. M. GRONVOLD & M. JACKSON.
NON-SKID AND EMERGENCY BRAKE ATTACHMENT.
APPLICATION FILED JULY 7, 1917.

1,264,386.

Patented Apr. 30, 1918.

UNITED STATES PATENT OFFICE.

CHRISTIAN H. M. GRONVOLD AND MAXEY JACKSON, OF NORTH YAKIMA, WASHINGTON.

NON-SKID AND EMERGENCY BRAKE ATTACHMENT.

1,264,386.

Specification of Letters Patent. Patented Apr. 30, 1918.

Application filed July 7, 1917. Serial No. 179,175.

*To all whom it may concern:*

Be it known that CHRISTIAN H. M. GRONVOLD and MAXEY JACKSON, citizens of the United States, residing at North Yakima, in the county of Yakima and State of Washington, have invented certain new and useful Improvements in Non-Skid and Emergency Brake Attachments, of which the following is a specification.

This invention relates to non-skid and emergency brake attachments for vehicles and particularly for automobiles.

The object of the invention is to provide a trailing ground wheel under control of the driver of an automobile and mounted in such manner as to adapt it to be thrown into engagement with the ground or lifted clear of the ground. When thrown into engagement with the ground it is susceptible of manipulation in such manner that it may engage the ground with a mere rolling motion to thereby prevent skidding of the vehicle or if the emergencies of the occasion require it may be subjected to a retarding action such as will constitute it an emergency brake.

Figure 1:
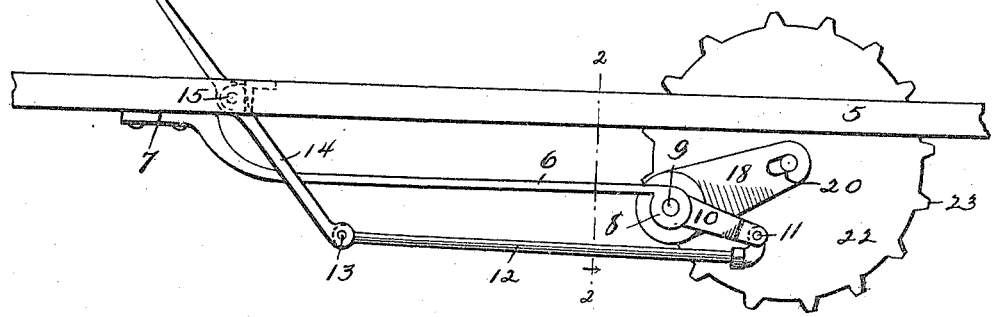
Figure 2:
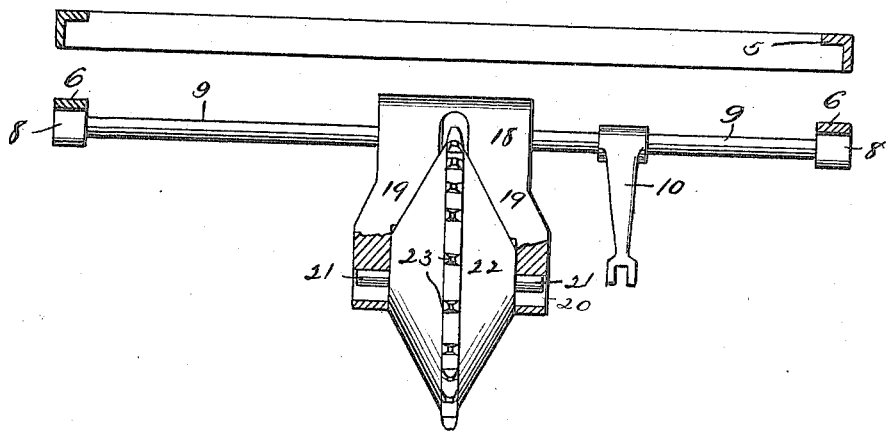

Further objects and advantages of the invention will be set forth in the detailed description which now follows:

In the accompanying drawing,

Figure 1 is a side view of our improved non-skid and braking attachment showing it in the position it occupies when moved out of engagement with the ground, and Fig. 2 is a transverse, vertical, sectional view upon line 2—2 of Fig. 1 but illustrating the parts in the position they occupy when the trailing wheel has been moved to such position that it acts as an emergency brake and with a connecting rod, (hereinafter described) omitted.

Like numerals designate corresponding parts in both of the figures of the drawing.

Referring to the drawing 5 designates the frame of an automobile. Strong leaf springs 6 are secured at 7 to the frame 5 and these springs are provided at their free ends with bearings 8, said bearings serving as a mounting for a transverse shaft 9. The shaft 9 carries a crank 10 and is pivotally connected at 11 to one end of a rod 12. The opposite end of the rod 12 is pivotally connected at 13 to the lower ends of a lever 14. This lever is pivoted at 15 to a part of the frame 5. It will, therefore, be seen that manipulation of the lever 14 will move the crank 10 to thereby rock the shaft 9.

The shaft 9 has fixedly secured thereto a V shape frame 18. The legs 19 of this frame are slotted at 20 for the reception of the stub shafts 21 of a trailing ground wheel 22. This ground wheel is peripherally provided with teeth 23 and is of such shape that its opposite sides conform to the inclination of the inner faces of the legs 19 of the V shaped frame 18.

The operation of the device is as follows:

Under normal conditions the parts lie in the position illustrated in Fig. 1 at which time the ground wheel is held well above the ground and above the line of the vehicle where it will be entirely out of the way.

If it be desired to use the device forming the subject-matter of the present invention merely to prevent side slip of the vehicle the lever 14 may be manipulated to move the wheel 22 to such a position that its teeth 23 will come in contact with the ground. At this time the wheel 22 is capable of a rolling motion, the stub-shafts 21 turning in the slot 20.

In case of emergency, however, when it is desired to provide a quick and powerful braking action to the vehicle as in avoiding collisions or in descending very steep hills, the lever 14 may be swung to such position that the legs 19 will lie in a substantially vertical position. The leaf springs 6 are strong and powerful and when the legs 19 are brought to vertical position the stub-shafts 21 ride upwardly in the slot 20 to wedge the outer faces of the ground wheel 22 against the inclined surfaces 24 of the legs 19 whereupon these interengaging faces act as braking elements to positively lock the wheel 22 against rotation and to impart a powerful braking action to the vehicle.

It is apparent that the degree of resistance applies to the rotation of the wheel 22 though the means aforesaid may be varied by proper manipulation of the lever 14.

From the foregoing description it will be seen that very simple and inexpensive means are herein provided through which an automobile may be safe guarded against disastrous skidding and may also be provided with an exceedingly powerful emergency brake, because the toothed wheel 22 digs into the ground and gives a firmer grip upon the ground than would be possible with any smooth surfaced element.

It is to be understood that the invention is not limited to the precise construction set forth but that it includes within its purview whatever changes fairly come within the spirit of the appended claims.

Having described our invention what we claim is:—

1. A structure of the character described comprising a spring supporting means, a swingingly mounted frame carried thereby and comprising divergent braking surfaces, a toothed ground wheel mounted in said frame in such manner as to permit it to have a rolling motion therein and in such manner as to permit it to move bodily into the frame to bring its surface into engagement with the braking surfaces and manually operable means for imparting swinging movement to said frame.

2. A structure of the character described, comprising a transverse shaft, a swingingly mounted frame carried thereby and comprising divergent arms having slots formed therein, a ground wheel mounted between the divergent arms and having its side faces shaped to conform to the shape of the divergent arms whereby the side faces of the ground wheel may be caused to engage with a braking action against the faces of the arms, stub shafts carried by the ground wheel and engaging in the slotted openings of the arms and manually operable means for moving the swinging frame to bring the ground wheel into engagement with the ground.

3. A structure as recited in claim 2 comprising leaf springs in which the transverse shaft is supported.

In testimony whereof we affix our signatures.

CHRISTIAN H. M. GRONVOLD.
MAXEY JACKSON.

Copies of this patent may be obtained for five cents each, by addressing the " Commissioner of Patents, Washington, D. C."